(12) United States Patent          (10) Patent No.:     US 7,913,907 B2
Smith et al.                       (45) Date of Patent:      Mar. 29, 2011

(54) READ STATE RETENTION CIRCUIT AND METHOD

(75) Inventors: Sterling Smith, Hsinchu Hsien (TW); Chung-Ho Ning, Hsinchu County (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 492 days.

(21) Appl. No.: 11/889,695

(22) Filed: Aug. 15, 2007

(65) Prior Publication Data

US 2008/0144358 A1     Jun. 19, 2008

(30) Foreign Application Priority Data

Dec. 14, 2006   (TW) ............................... 95146943 A

(51) Int. Cl.
*G06K 7/10*          (2006.01)

(52) U.S. Cl. .................... 235/451; 235/472.02

(58) Field of Classification Search .................. 235/436, 235/451, 472.02, 476; 250/271, 580, 215; 340/2.7, 3.3, 3.7, 10.4, 10.42

See application file for complete search history.

(56) References Cited

U.S. PATENT DOCUMENTS

| 6,348,908 | B1 * | 2/2002 | Richley et al. ............... 250/215 |
| 6,812,841 | B2 | 11/2004 | Heinrich et al. |
| 7,116,240 | B2 * | 10/2006 | Hyde ........................... 340/661 |
| 2004/0145454 | A1 | 7/2004 | Powell et al. |
| 2005/0179520 | A1 | 8/2005 | Ziebertz |
| 2006/0158315 | A1 * | 7/2006 | Usami ....................... 340/10.42 |

* cited by examiner

*Primary Examiner* — Thien M Le

(74) *Attorney, Agent, or Firm* — Rabin & Berdo, P.C.

(57) ABSTRACT

A read state retention circuit and method are disclosed. The read state retention circuit comprises a charge storage unit, charging unit, sensing circuit and state indicator. The charging circuit is coupled to the charge storage unit for charging the charge storage unit. The sensing circuit is coupled to the charge storage unit for sensing a voltage level of the charge storage unit. The state indicator is coupled to the sensing circuit for outputting an indication signal in response to the voltage level.

16 Claims, 5 Drawing Sheets

US 7,913,907 B2

READ STATE RETENTION CIRCUIT AND METHOD

This application claims the benefit of Taiwan application Serial No. 95146943, filed Dec. 14, 2006, the subject matter of which is incorporated herein by reference.

BACKGROUND OF THE INVENTION

1. Field of the Invention

The invention relates in general to a retention circuit and method, and more particularly to a read state retention circuit and method.

2. Description of the Related Art

A radio frequency identification (RFID) system transmits identification data by radio waves and accordingly the manager can manage goods in a wireless way. The RFID system consists of a number of RFID tags and readers. When the RFID system is applied in goods management, each of the goods has an RFID tag for storing the corresponding identification data, such as a name of goods, goods source, and purchase date. To search or identify the goods in an identification range is a common operation of the RFID system.

When the reader reads the identification data stored in an RFID tag and identifies that it is not the identification data required by the user, the reader sends out an instruction to set the RFID tag to be a "read state". When the RFID tag receives RF energy sent out by the reader again within a duration, the RFID tag will respond to the reader that it has been read or will not respond to the reader within a predetermined duration. In this way, the number of RFID tags to be read can be gradually reduced until the required identification data are searched or all the required goods are listed.

However, in the process when the reader continues reading the remaining RFID tags which are not read, if the "read state" of the RFID tags which have been read cannot be maintained, there occurs a serious situation that some RFID tags will be read repeatedly, thus reducing search efficiency. In a serious situation, owing that the search time is too long, the "read state" of a large number of the RFID tags which have been read cannot be maintained and these RFID tags are read repeatedly, which causes the required identification data cannot be searched.

Therefore, to ensure the "read state" of the RFID tags which have been read to be maintained during the search time of the reader is an essential subject.

SUMMARY OF THE INVENTION

The invention is directed to a read state retention circuit applied in RFID to increase search efficiency.

According to a first aspect of the present invention, a read state retention circuit applied in RFID is provided. The read state retention circuit comprises a charge storage unit, charging unit, sensing circuit and state indicator. The charging circuit is coupled to the charge storage unit for charging the charge storage unit. The sensing circuit is coupled to the charge storage unit for sensing a voltage level of the charge storage unit. The state indicator is coupled to the sensing circuit for outputting an indication signal in response to the voltage level.

According to a second aspect of the present invention, a read state retention method is provided. The method comprises steps of asserting a read signal; raising a voltage level of the read signal; and charging a capacitor by an NMOS transistor in response to the raised voltage level of the read signal.

The invention will become apparent from the following detailed description of the preferred but non-limiting embodiments. The following description is made with reference to the accompanying drawings.

DETAILED DESCRIPTION OF THE INVENTION

The invention provides a read state retention circuit which can maintain the "read state" of the RFID tags in the process when the reader performs a searching or goods listing operation on the RFID tags. Therefore, the efficiency of identifying specific data or making a goods list can be increased in the searching process of the reader.

Figure 1:
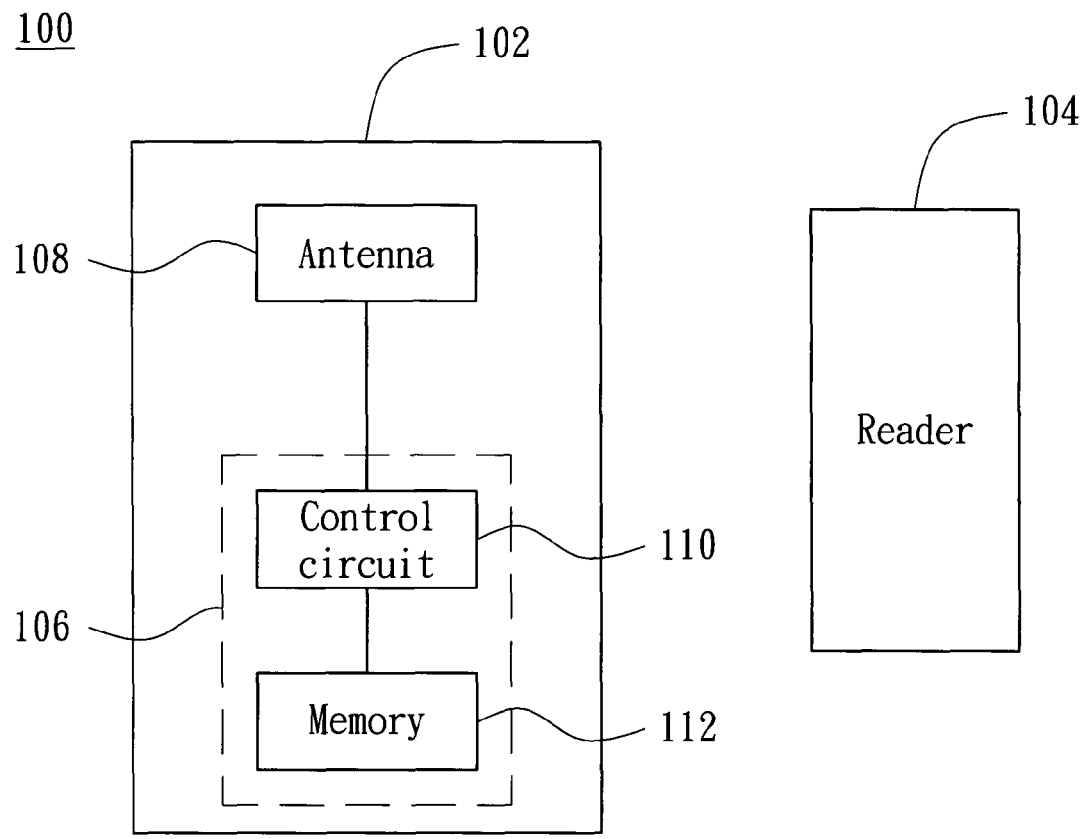
FIG. 1 is a schematic diagram of an RFID system according to a preferred embodiment of the invention.

Referring to FIG. 1, a schematic diagram of an RFID system 100 according to a preferred embodiment of the invention is shown. The RFID system 100 includes an RFID tag 102 and a reader 104. The RFID tag 102 includes a chip (or die) 106 and an antenna 108. The antenna 108 receives a radio frequency signal RF sent out by the reader 104. The chip 106 includes a control circuit 110 and a non-volatile memory 112. The control circuit 110 is electrically coupled to the antenna 108 for controlling RFID tag operations, such as accessing the non-volatile memory 112 or setting a state of the RFID tag 102. The non-volatile memory 112, such as a flash memory, stores identification data ID.

Figure 2:
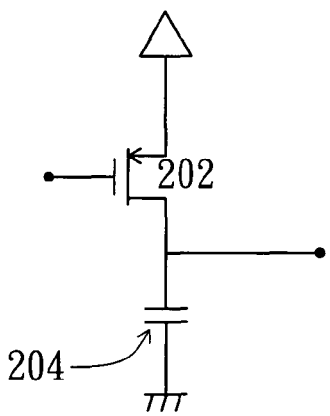
FIG. 2 is a circuit diagram of a read state retention circuit designed by intuition.

In the process of searching the RFID tag 102, the control circuit 110 integrates a read state retention circuit therein, and the reader 104 can command the RFID tag 102 to set the "read state". FIG. 2 shows a read state retention circuit designed by intuition. The read state retention circuit includes a p-type metal oxide semiconductor (PMOS) transistor 202 and a capacitor 204. By intuition, the PMOS transistor 202 is used to charge the capacitor 204 to provide the read state of the RFID tag 102. However, the PMOS transistor 202 has a drawback of electric leakage and is not an ideal design in this case.

Figure 3:
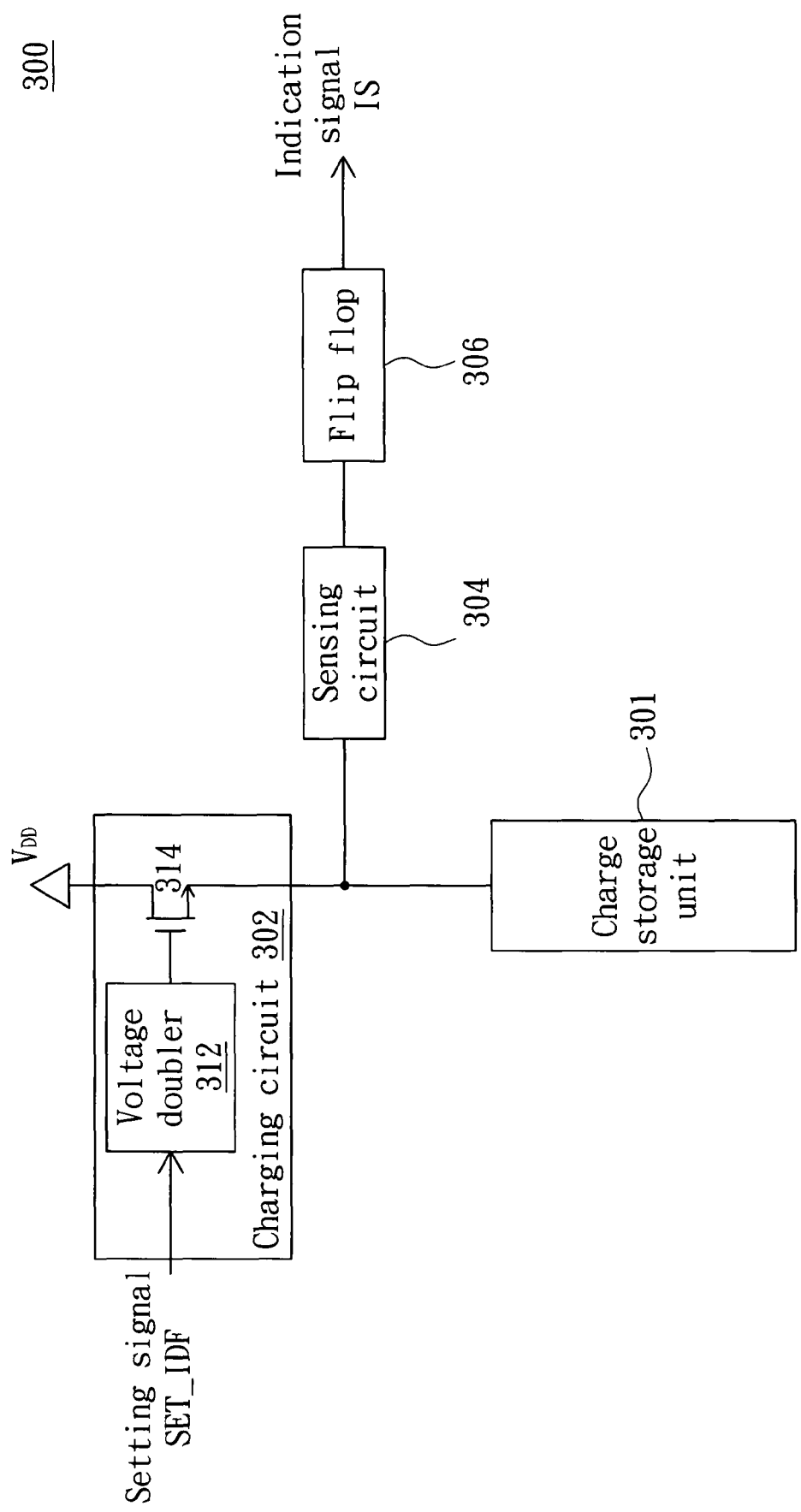
FIG. 3 is a block diagram of a read state retention circuit according to a preferred embodiment of the invention.

FIG. 3 is a block diagram of a read state retention circuit 300 according to a preferred embodiment of the invention. The read state retention circuit 300 includes a charge storage unit 301, a charging circuit 302, a sensing circuit 304 and a flip-flop 306. For example, the charge storage unit 301 is a capacitor which can be implemented by a semiconductor device. The read state retention circuit 300 can be applied in the control circuit 110 of FIG. 1 to charge the charge storage unit 301 and output an indication signal IS to a next-stage circuit in the control circuit 110 when the identification data ID of the RFID tag 102 is read. The indication signal IS indicates whether the identification data ID is read. Further, the read state retention circuit 300 is capable of correctly reading a voltage level of the charge storage unit 301 and timely recharging the charge storage unit 202 to ensure the "read state" is maintained when the RFID tag 102 receives RF energy.

When the identification data ID has been read, according to a setting signal SET_IDF, the charging circuit 302 charges the charge storage unit 301 to a certain voltage level, such as +2.5V. The sensing circuit 304 senses the voltage level of the charge storage unit 301 for setting a state, such as 1 or 0, of the flip-flop 306, and accordingly outputting the indication signal IS. For example, when the voltage level of the charge storage unit 301 is higher than a predetermined voltage level VX, the sensing circuit 304 senses the voltage level of the charge storage unit 202 to set the state of the flip-flop 306 to be 1, so the indication signal IS outputted by the flip-flop 306 represents the "read state". The next stage circuit of the control circuit 110 can determine that the identification data ID of the RFID tag 102 has been read by the reader 104 according to the indication signal IS. Moreover, it can determine whether the charge storage unit 202 requires to be recharged by the charging circuit 302 according to the indication signal IS.

When the reader 104 is to search specific identification data or list the goods within the identification range, the efficiency of searching and making a goods list can be improved by utilizing the above read state retention circuit 300. For example, in an application of a plurality of RFID tags 102(1)~102(N), N is a positive integer, when the reader 104 reads the identification data ID(1) stored in the first RFID tag 102(1), and the identification data ID(1) is determined not to be the desired data of the user or the identification data ID of goods is read, the reader 104 commands to set the "read state" of the first RFID tag 102(1) and controls the charging circuit 302 to charge the charge storage unit 301. Accordingly, the sensing circuit 304 sets the flip-flop 306 to be the state 1, which denotes the "read state". Afterwards, in the process when the reader 104 reads other RFID tags 102(2)~102(N), and the first RFID tag 102(1) receives RF energy sent out by the reader 104, if the voltage level of the charge storage unit 301(1) is higher than a predetermined voltage level VX, the sensing circuit 304(1) sets the flip-flop 306 to be the state "1". The charging circuit 302 recharges the charge storage unit 202 according to the state of the flip-flop 306 to increase the voltage level of the charge storage unit 301 to the predetermined level, such as +2.5V, in order to maintain the "read state" once again.

Referring to the read state retention circuit 300 of FIG. 3 again, by asserting the setting signal SET_IDF, the charging circuit 302 charges the charge storage unit 301. Preferably, the charging circuit 302 includes a voltage doubler 312 and an n-type metal oxide semiconductor (NMOS) transistor 314. For example, the charge storage unit 301 is a capacitor which can be implemented by a semiconductor device. Utilizing the NMOS transistor 314 to charge the charge storage unit 301 contains very low electricity leakage, thus benefiting the RFID tag without an active power source. However, the drain-source voltage drop of the NMOS transistor 314 and a gate voltage to control the NMOS transistor 314 determines a final charged voltage of the charge storage unit 301. If the charge storage unit 301 contains a low charged voltage, the information stored in the charge storage unit 301 will be easily lost as time passes. In this embodiment, the voltage doubler 312 doubles the voltage level of the setting signal SET_IDF. The doubled voltage of the setting signal SET_IDF is inputted to the gate of the NMOS transistor 314 such that the NMOS transistor 314 can charge the charge storage unit 301 to have the charged voltage as close to $V_{DD}$ as possible. After the charging operation, due to the no-electric-leakage feature of the NMOS transistor 314, the voltage of the charge storage unit 301 can be maintained for a very long time, e.g. more than 2 seconds. As a result, after the RFID tag has been set to be the "read state", the reader can command the RFID tag to enter a sleep state and when the RFID tag is awakened, it can correctly maintain the "read state" for a long period without any possible errors. This is very beneficial in searching operations among many RFID tags.

Figure 4:
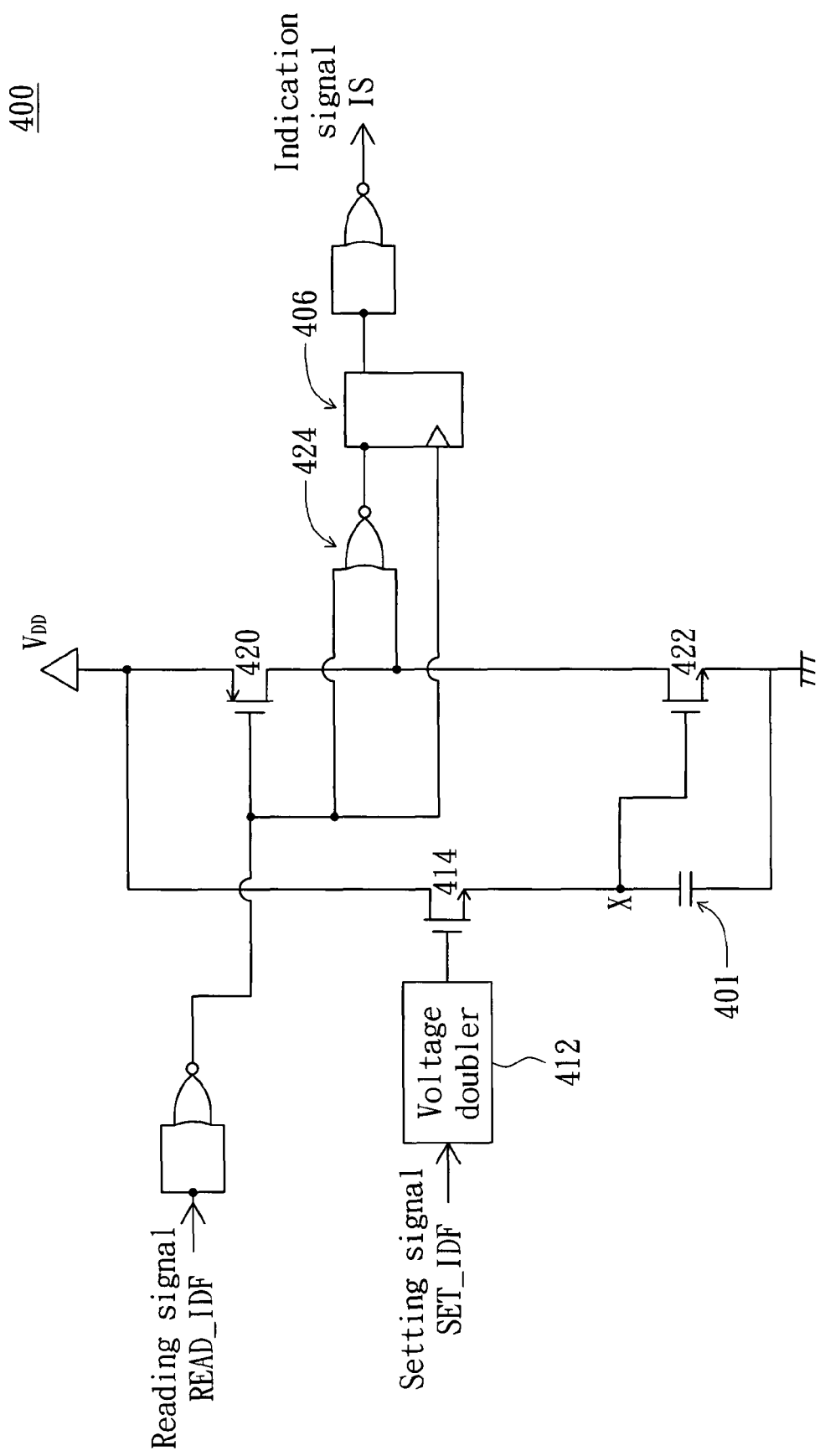
FIG. 4 is a detailed read state retention circuit according to the preferred embodiment of the invention.

FIG. 4 is a detailed diagram of a read state retention circuit 400 according to the preferred embodiment of the invention. By asserting the setting signal SET_IDF to set the read state, the voltage doubler 412 doubles the voltage of the signal SET_IDF to increase a gate voltage of the NMOS 414 for charging the capacitor 401 in order to store a voltage for the read state at a node X. When the RFID tag commands to read the present read state, the reading command is asserted via a reading signal READ_IDF and accordingly the sensing circuit senses the voltage of the capacitor 401 at the node X. In this embodiment, a PMOS transistor 420, NMOS transistor 422 and NOR gate 424 are applied to sense the voltage at the node X. The signal READ_IDF triggers the flip-flop 406 to set the sensing result in the indication signal IS for the next-stage processing of the RFID tag. It should be noted that the node X is coupled to a gate of the NMOS transistor 422. Effective charging and no electric leakage of the NMOS transistor 414 maintains the voltage stored at the node X for a long time. As long as the level of the NOR gate 424 in the sensing circuit is higher than the minimal operational voltage, the "read state" can be correctly maintained and outputted via the indication signal IS. Besides, a discharging circuit can be implemented at the node X for discharging the voltage at the node X, whose detail is omitted here.

Figure 5:
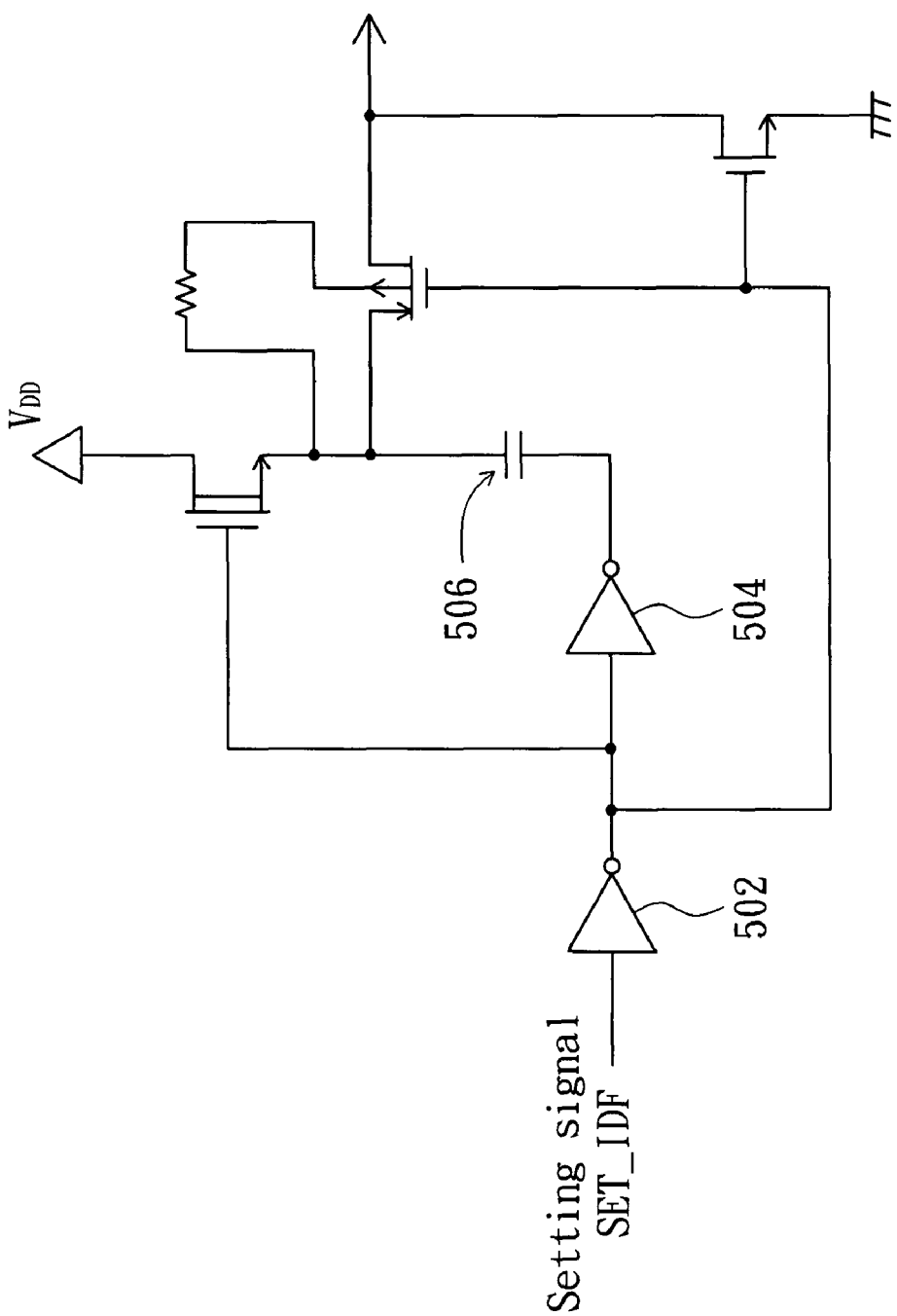
FIG. 5 is a detailed diagram of a voltage doubler applied to the read state retention circuit in FIG. 4 according to the preferred embodiment of the invention.

FIG. 5 is a detailed diagram of the voltage doubler 412 of the read state retention circuit 400 in FIG. 4 according to the preferred embodiment of the invention. The voltage doubler 412 doubles the voltage of the signal SET_IDF via two inverters 502 and 504 and a capacitor 506 in response to the signal SET_IDF. The doubled signal SET_IDF controls the charging operation of the NMOS 414 transistor in FIG. 4.

According to the read state retention circuit disclosed by the above embodiment of the invention, in the process when the reader reads several RFID tags, the RF signal is present intermittently. The read state retention circuit effectively maintains the read state stored in the charge storage unit to be above the predetermined voltage level VX when the RF signal is not present. When the RF signal is present, the charge storage unit can be recharged as commanded. Therefore, the present invention effectively maintains the "read state" for a large number of RFID tags to avoid that the searching time is too long, thus preventing from repeatedly reading or being incapable of searching the required identification data.

Figure 6:
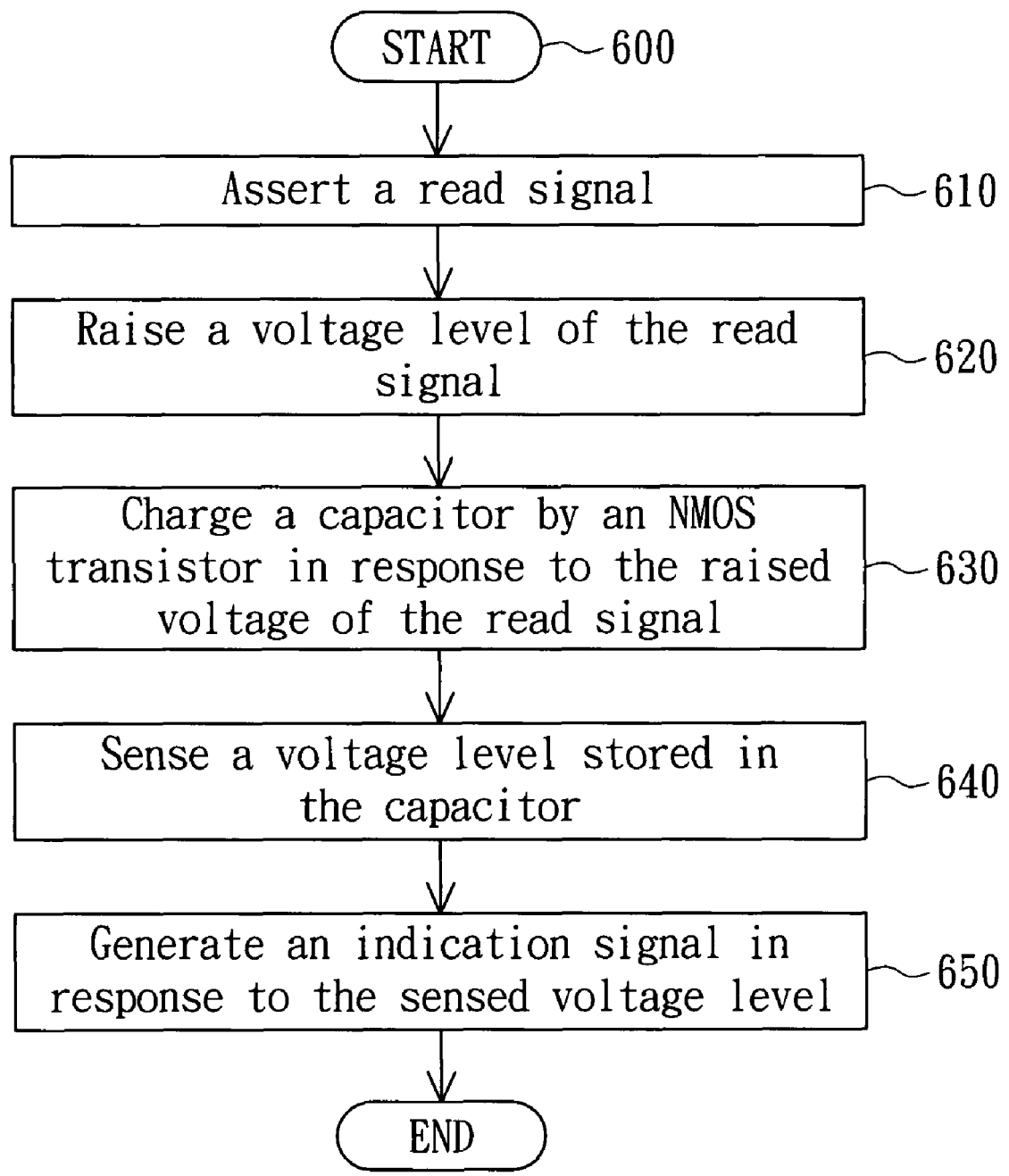
FIG. 6 is a flowchart of a read state retention method according to the preferred embodiment of the invention.

FIG. 6 is a flowchart of a read state retention method according to the preferred embodiment of the invention. First, in step 610, assert a read signal. In step 620, raise a voltage level of the read signal, for example, double the voltage level of the read signal by a voltage doubler. In step 630, charge a capacitor by an NMOS transistor in response to the raised voltage of the read signal. In step 640, sense a voltage level stored in the capacitor. In step 650, generate an indication signal in response to the sensed voltage level to indicate a read state.

As mentioned above, the invention discloses a read state retention circuit applied in RFID. The read state retention circuit includes a charge storage unit, a charging circuit, a sensing circuit and a state indicator. The charging circuit is coupled to the charge storage unit for charging the charge storage unit. The sensing circuit is coupled to the charge storage unit for sensing a voltage level of the charge storage unit. The state indicator is coupled to the sensing circuit for generating an indication signal in response to the voltage level. The charge storage unit can be a capacitor and the state indicator can be a flip-flop. The read state retention circuit can receive a reading signal to trigger the sensing circuit and state indicator for sensing a voltage level of the charge storage unit and generating the indication signal. The sensing circuit includes a PMOS transistor, an NMOS transistor, and a NOR gate. The PMOS transistor comprises a drain coupled to a drain of the NMOS transistor and the NOR gate, and the NMOS transistor comprises a gate coupled to the charge storage unit in order to sense the voltage level of the charge storage unit without leakage. Preferably, the read state retention circuit and the RFID tag are integrated into a single semiconductor chip or die.

While the invention has been described by way of a preferred embodiment, it is to be understood that the invention is not limited thereto. On the contrary, it is intended to cover various modifications and similar arrangements and procedures, and the scope of the appended claims therefore should accord with the broadest interpretation so as to encompass all such modifications, similar arrangements and procedures.

What is claimed is:

1. A read state retention circuit, applied in radio frequency identification (RFID), the read state retention circuit comprising:
   a charge storage unit;
   a charging circuit, coupled to the charge storage unit for charging the charge storage unit, the charging circuit having an NMOS transistor, the NMOS transistor being configured to charge the charge storage unit and having a drain terminal coupled to an operation voltage; and
   a sensing circuit, coupled to the charge storage unit for sensing a voltage level of the charge storage unit.

2. The read state retention circuit according to claim 1, further comprising a state indicator, coupled to the sensing circuit for generating an indication signal in response to the voltage level.

3. The read state retention circuit according to claim 2, wherein the state indicator is a flip-flop.

4. The read state retention circuit according to claim 3, being applied to an RFID tag, wherein the RFID tag responds to a reader whether the RFID tag has been read according to the indication signal.

5. The read state retention circuit according to claim 4, wherein a reading signal is asserted to trigger the sensing circuit and the state indicator to sense the voltage level of the charge storage unit and generate the indication signal in response to the voltage level, wherein the indication signal is asserted to indicate that the RFID tag is read.

6. The read state retention circuit according to claim 1, wherein the charge storage unit is a capacitor and charge on the charge storage unit represents a read state.

7. The read state retention circuit according to claim 1, wherein the sensing circuit comprises a p-type metal oxide semiconductor (PMOS) transistor, an n-type metal oxide semiconductor (NMOS) transistor and a NOR gate, the PMOS transistor has a drain coupled to a drain of the NMOS transistor and the NOR gate, and the NMOS transistor has a gate coupled to the charge storage unit in order to sense the voltage level of the charge storage unit.

8. The read state retention circuit according to claim 1, wherein the read state retention circuit is implemented in a single semiconductor chip.

9. The read state retention circuit according to claim 1, wherein the charging circuit comprises a voltage doubler, coupled to the NMOS transistor, wherein the voltage doubler receives a setting signal and doubles a voltage level of the setting signal to control the NMOS transistor to charge the charge storage unit.

10. The read state retention circuit according to claim 9, wherein the voltage doubler comprises a first inverter, a second inverter and a capacitor successively connected in series.

11. A read state retention method, comprising:
    asserting a read signal;
    raising a voltage level of the read signal; and
    charging a capacitor by an NMOS transistor in response to the raised voltage level of the read signal, the NMOS transistor having a drain terminal coupled to an operation voltage.

12. The method according to claim 11, wherein the raising step doubles the voltage level of the read signal by a voltage doubler.

13. The method according to claim 12, further comprising a step of sensing a voltage level stored in the capacitor.

14. The method according to claim 13, further comprising a step of generating an indication signal to indicate a read state in response to the sensed voltage level of the capacitor.

15. The method according to claim 11, wherein charge on the capacitor represents a read state.

16. The method according to claim 15, wherein the charging step charges the capacitor by the NMOS transistor in response to the raised voltage level of the read signal whereby the read state is retained.

* * * * *